United States Patent
Yamada et al.

(10) Patent No.: US 8,069,273 B2
(45) Date of Patent: Nov. 29, 2011

(54) PROCESSING MODULE

(75) Inventors: Tsutomu Yamada, Hitachinaka (JP); Hiromichi Endoh, Hitachi (JP); Noritaka Matsumoto, Hitachi (JP); Satoru Funaki, Hitachi (JP); Atsushi Ito, Shiroi (JP); Norihisa Yanagihara, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 548 days.

(21) Appl. No.: 11/491,247

(22) Filed: Jul. 24, 2006

(65) Prior Publication Data
US 2007/0038745 A1    Feb. 15, 2007

(30) Foreign Application Priority Data
Jul. 26, 2005  (JP) ................................ 2005-215691

(51) Int. Cl.
G06F 3/00     (2006.01)
(52) U.S. Cl. ......................................................... 710/8
(58) Field of Classification Search ............... 710/43, 710/8
See application file for complete search history.

(56) References Cited

U.S. PATENT DOCUMENTS

| | | | |
|---|---|---|---|
| 4,378,588 A * | 3/1983 | Katzman et al. ................. 710/57 |
| 4,992,976 A * | 2/1991 | Yonekura et al. ................. 710/10 |
| 5,572,680 A * | 11/1996 | Ikeda et al. .................... 709/243 |
| 5,581,787 A | 12/1996 | Saeki et al. | |
| 5,793,998 A * | 8/1998 | Copeland et al. ............. 710/305 |
| 5,978,894 A | 11/1999 | Sukegawa et al. | |
| 6,044,411 A * | 3/2000 | Berglund et al. .................. 710/9 |
| 6,122,687 A | 9/2000 | Jung | |
| 6,547,569 B1 * | 4/2003 | Issaa ............................... 439/65 |
| 6,920,519 B1 * | 7/2005 | Beukema et al. ............. 710/306 |
| 6,944,786 B2 * | 9/2005 | Kashyap ........................... 714/4 |
| 7,007,078 B2 * | 2/2006 | Matsuda ........................ 709/220 |
| 7,024,494 B1 * | 4/2006 | Pathan et al. ................... 710/10 |
| 2001/0031568 A1 * | 10/2001 | Brekosky et al. ............... 439/74 |
| 2003/0208531 A1 * | 11/2003 | Matters et al. ................ 709/203 |
| 2005/0278566 A1 * | 12/2005 | Jones et al. ....................... 714/9 |

FOREIGN PATENT DOCUMENTS

| | | |
|---|---|---|
| JP | 64-010369 | 1/1989 |
| JP | 2-133852 | 5/1990 |
| JP | 09-006271 | 1/1997 |
| JP | 10-91576 | 4/1998 |

OTHER PUBLICATIONS

"PCI Local Bus Specification Revision 2.2—Chapter 2: Signal Definition", Dec. 18, 1998, p. 13.
PC/104 Embedded Consortium: "PC/104-Plus Specification Version 2.0 Nov. 2003", retrieved from the internet.

(Continued)

*Primary Examiner* — Henry Tsai
*Assistant Examiner* — Eric Oberly
(74) *Attorney, Agent, or Firm* — Antonelli, Terry, Stout & Kraus, LLP.

(57) ABSTRACT

A processing module to use for a processing system having a plurality of processing modules connected via a communication line is comprising mounting position information for the processing module in the communication line; a unique logical address to indicate the processing module; a database to correspond with a physical address of the processing module in the communication line; a position identification device to identify the mounting position information in the communication line of the processing module;
  a unique/physical address conversion device to fetch the physical address corresponding to the unique logical address from the database using a data packet having the unique logical address as a destination; and
a position/physical address conversion device for searching for the physical address from the mounting position information.

6 Claims, 9 Drawing Sheets

OTHER PUBLICATIONS

PCT Industrial Computer Manufactures Group: "PICMG 2.14 R1.0 CompactPCI MultiComputing Short Form Specification", Sep. 6, 2001, pp. 1-6, retrieved from the internet.

"CompactPCI Multicomputing Short Form Specification" PICMG2.14, Sep. 6, 2001.

* cited by examiner

| PHYSICAL POSITION INFORMATION | UNIQUE LOGICAL ADDRESS | PHYSICAL ADDRESS | |
|---|---|---|---|
| | | START | END |
| 1 | 00:00:01 | 0x0000 | 0x0FFF |
| 2 | 00:00:02 | 0x1000 | 0x1FFF |
| 3 | 00:00:03 | 0x2000 | 0x2FFF |
| F | 00:00:0F | 0xF000 | 0xFFFF |

PROCESSING MODULE

CLAIM OF PRIORITY

The present application claims priority from Japanese Application Serial No. 2005-215691, filed on Jul. 26, 2005, the contents of which is hereby incorporated by references into this application.

BACKGROUND OF THE INVENTION

1. Field of the Technology

This invention relates to a communication device for transmitting information between a plurality of modules. This invention relates in particular to a communication device for performing settings relating to autonomous communication in a plurality of module devices.

2. Background of Art

An example of the communication method for connecting the plurality of modules in the case where the modules are connected by a parallel bus in particular is the communication method disclosed in Patent Document 1. That is to say, in the system bus architecture in which the first module (system processing device) is connected to the second module (system interface device) via the system bus, transmitting and receiving operations are performed between the first and second module via the SRAM common bus memory.

Another example of the communication method is the multi-computing communication method that is disclosed in Non-Patent Document 1. That is to say, in the bus architecture comprising one system node (SN) and a plurality of peripheral nodes (PN) which are connected by the PCI bus, transmitting and receiving operations are performed via the common memory on the PCI bus. In addition, it is necessary for the system node to mediate communication from a plurality of peripheral nodes. For example, the system node constructs a memory map when the system starts up and operates as a mediator at the time of broadcast.

[Patent Document 1] Japanese Application Patent Laid-Open Publication No. Hei 09-6271

[Non Patent Document] PICMG2.14 "Compact PCI Multi-computing Specification"

SUMMARY OF THE INVENTION

The module communication method in the system bus architecture of Patent Document 1 does not disclose an address resolution method used in transmitting or receiving in the module communication. For that reason, a design engineer who constructs the system bus architecture statically allocates each module address, and a design engineer of the communication software must perform designing such that transmitting and receiving is done while aware of the module address of the communication destination. In the system according to the Patent Document 1, the burden on the design engineer is large and there are problems in flexibility and ease of system construction.

Meanwhile, in the multi-computing communication method described in the Non-Patent Document 1, the system node does an address resolution used in transmitting and receiving in module communication. For this reason, the existence of at least one special node in the system called a system node is required for performing the address resolution. The role carried by the system node extends over a wide range and thus the system node requires great amounts of processing capabilities and memory capacity, and must have a configuration that is different from the other nodes.

However, presuming the existence of a special module such as the system node in order to perform communication between modules is particularly problem in embedded computer systems in which a large number of parts are used and there are many cost limitations.

In addition, in the case where the processing system is applied to a real time control system, the effect of the load increase in the system node on real time control capabilities causes concern.

The object of this invention is to provide, in view of the above prior art technology, a communication device in which each module itself does address resolution when performing communication between the modules, without the module communication device in the processing system depending on a specific module and autonomous communication can be done.

[Means for Solving the Problems]

The processing module of this invention to solve the above problems being used in a processing system having a plurality of processing modules connected via a communication line is characterized by comprising: mounting position information for the processing module in the communication line; a unique logical address to indicate the processing module; and a database to correspond with a physical address of the processing module in the communication line; a position identification device to identify the mounting position information in the communication line of the processing module; a unique/physical address conversion device to fetch the physical address corresponding to the unique logical address from the database using a data packet having the unique logical address as a destination; and a position/physical address conversion device for searching for the physical address from the mounting position information.

In addition, the processing module is characterized by comprising a communication device for performing communication between the processing modules and a memory for storing communication data received from the communication line by request from the communication device.

In addition, the communication device of the processing module is characterized by comprising an interrupt notification device to notify a communication data to a processing device inside the processing module after receiving the communication data from another processing module.

Another processing module of this invention being used in a processing system having a plurality of processing modules connected via a communication line is characterized by comprising: mounting position information for the processing module in the communication line; a unique logical address to indicate the processing module; and a database to correspond with a physical address of the processing module in the communication line; a position identification device to identify the mounting position information in the communication line of the processing module; a unique/physical address conversion device to fetch the physical address corresponding to the unique logical address from the database using a data packet having the unique logical address as a destination; and a position/physical address conversion device for searching for the physical address from the mounting position information; wherein a send destination for the data packets is determined by the unique logical address of the destination included in the data packet, and in the case where the unique logical address of the destination is in a plurality of processing modules, the physical address of all the processing modules in the processing system are searched from the database and sent to the send destination.

In addition, the processing module is characterized by comprising the communication line is included in processing module and the processing system can be constructed by stacking the processing modules.

Furthermore, the processing module is characterized by comprising the communication line performs data communication using a PCI bus protocol.

[Effects of the Invention]

According to this invention, it is possible for each processing module to ascertain its own physical position in a processing system comprising a plurality of processing modules. For this reason, a resources (for example, a unique logical address and a processing module physical address) relating to the processing modules are not managed at the center and it is possible for each processing module to set the resources itself. As a result, the processing at the processing modules is equalized and there is the effect that a configuration suitable for embedded computers and configuring processing modules by cost is possible.

DETAILED DESCRIPTION OF THE INVENTION

This invention relates to a device for performing communication between a pluralities of modules that comprise a processing system and realizes a communication device for performing settings relating to autonomous communication. Multiple embodiments of this invention will be described with reference to the drawings.

Embodiment 1

Figure 1:
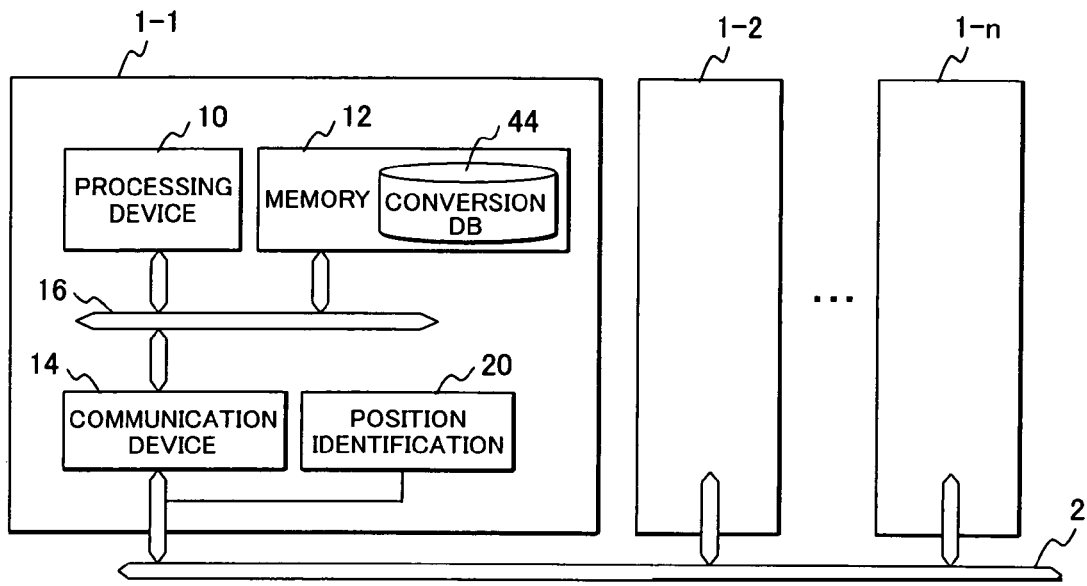
FIG. 1 is a configuration drawing of the processing system in embodiment 1 of this invention.

FIG. 1 shows a configuration drawing of the processing system in the first embodiment according to this invention. In the processing system, a plurality of processing modules 1 (indicated by 1-*n* when the nth module is shown in particular) is connected via a system communication line 2. The processing module 1 comprises a processing device 10, a memory 12, a communication device 14, and a position identifying device 20. The processing device 10, the memory 12, the communication device 14 are connected by a local communication line 16, and data is received and passed between these devices.

The processing device 10 utilizes a general processor which repeats fetch and execution instructions as well as a reconfigurable processor which dynamically forms processor device content.

The memory 12 has the instruction and variable values that the processing device 10 fetches and data used in communication. In addition, the memory 12 has a conversion database 44 which includes data relating to a physical position of the processing module 1. The conversion database 44 has a function of fetching physical addresses corresponding to the physical position of the processing module 1. It is to be noted that the description of the relationship between these memories 12 and the conversion database 44 will be described in detail hereinafter.

The communication device 14 has a function of sending communication data to the system communication line 2 according to requests from the processing device 10 or receiving communication to the memory 12 in accordance with requests from the system communication line 2. The communication data has physical address information which indicates a destination of the data. The communication device 14 individually sets a range of the physical address which it accepts itself. When the communication data is output to the system communication path 2, each communication device 14 searches for the destination physical address for the communication data and receives the corresponding communication data if it is included in the address range which it accepts itself.

The local communication line 16 and the system communication path 2 have functions of transmitting communication data between a plurality of processing modules 1. In order to transmit the communication data, utilizing a communication device for connecting between devices using a serial communication line like a bus for connecting a general use SRAM or an address data time division multiplexed bus such as or a peripheral component interconnect (PCI) bus is favorable. Use of obvious connection techniques by one skilled in the art is not limited by this invention.

The position identification device 20 is connected to the system communication line 2. The position identification device 20 is a device for the mounted processing module 1 to know its own physical position with respect to the other processing modules. A specific execution method for the position identification device 20 will be described hereinafter.

By the processing module 1 knowing its own physical position, calculation by a prescribed algorithm of an address range corresponding to itself becomes possible. The address range herein includes the communication data on the communication line and refers to the assembly of number rows (including empty assemblies) corresponding to the destination.

The outline of the operation of the processing module 1 will be described using these functions and devices. The processing module 1 determines its own physical position using the position identification device 20. The address that should respond to the processing module 1 and the address accepted by the processing module 1 with communication destination can be known from the physical position using the conversion database 44.

As a result, by knowing the physical position of the processing module 1 with which communication is done, it becomes possible for the processing module 1 to send a communication data to a processing module 1 with which communication is done. The procedure for knowing the physical position of the device with which communication is done will be described hereinafter. In addition, the processing module 1 knows its own physical address, and thus it becomes possible to determine whether there are requests to itself from the communication data address information received from the other processing modules 1.

Figure 2:
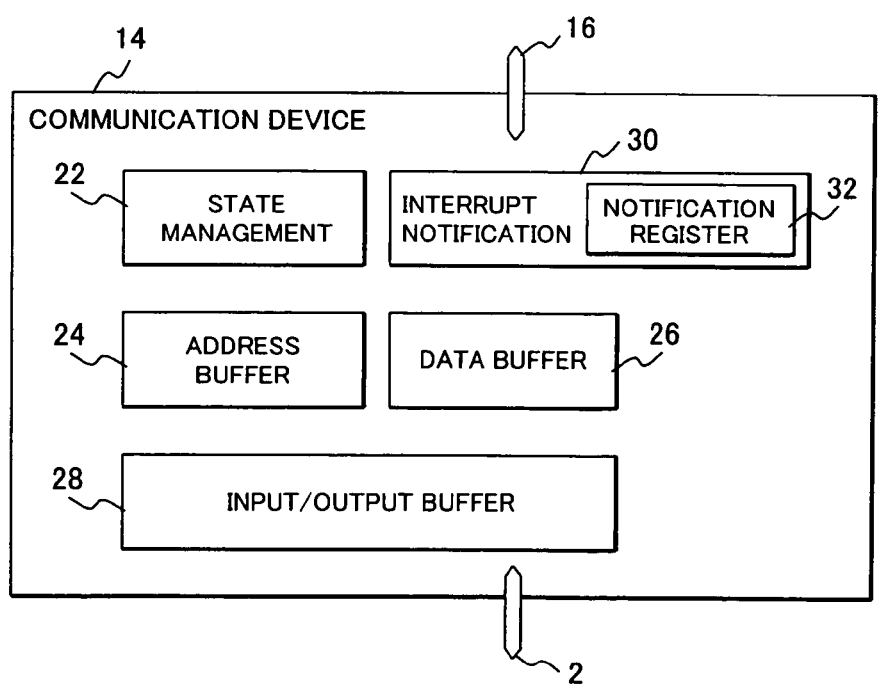
FIG. 2 is a configuration drawing of the communication device according to the embodiment 1.

FIG. 2 shows a configuration drawing of the communication device of the first embodiment according to this invention. The communication device 14 comprises a state management device 22, an address buffer 24, a data buffer 26, a system communication line 2 and an input/output buffer 28 which inputs and outputs communication data to the local communication line 16, and an interrupt notification function 30. It is to be noted that these functions do not necessarily need to be included in the same package, LSI or module, and for example even if only the interrupt notification function 30 is mounted as an independent part, the effects of this invention will not be lost.

The state management device 22 performs state management for the communication device 14. Specifically, it has a limit state machine (not shown) which performs direction control and output enable control of the address buffer 24 and the data buffer 26 and the input/output buffer 28 and a communication device control register (not shown) and a direct memory access (DMA) control device (not shown). The address buffer 24 and the data buffer 26 are memory elements which store the destination of the communication or the communication itself when communication data is delivered and received between the local communication line 16 and the system communication line 2. The address buffer 24 and the data buffer 26 may be prepared separately for each communication line respectively or may be used together.

The interrupt notification function 30 has an interrupt notification register 32 which is set from the communication device 14 with which communication is done, the fact that communication data from the side with which communication is done is sent as a interrupt report to the processing device 10. Because the interrupt notification register 32 is set at a suitably selected timing from a plurality of processing modules, the configuration is preferably one in which exclusive control is possible using a simple method. For example, the configuration may be such that a bit for each processing module which communicate is prepared for the interrupt notification register 32 and the processing module which is the origin of the notification inverts ("0 to 1" or from "1 to 0") the interrupt notification bit by writing "1" into the bit corresponding to itself. In this type of configuration, by making a bit which does not correspond with itself "0", the corresponding bits for the other processing modules is not affected.

It is to be noted that the processing module 1 which is the origin of the notification can determine it own physical position using the position identification device 20 and the bit that it is to set can be autonomously determined. In addition, the processing module 1 that has been notified can know which the physical position of the processing module from which the interrupt request comes based on the notified bit.

Figure 3:
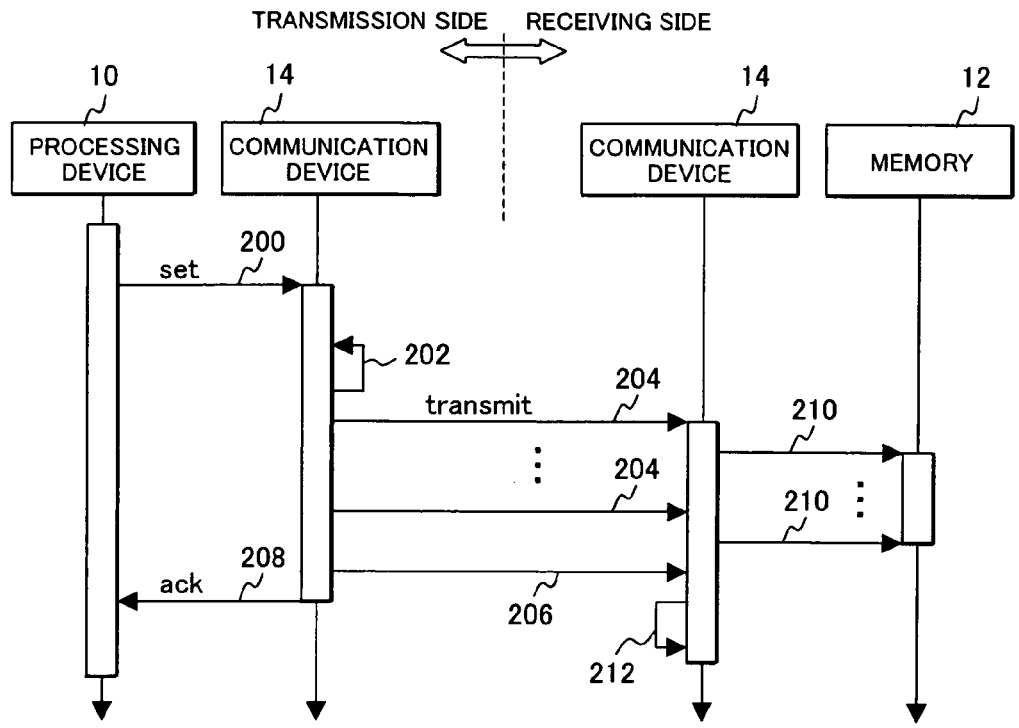
FIG. 3 is a communication operation sequence drawing of the communication devices according to the embodiment 1.

FIG. 3 is a sequence drawing which shows the communication data delivery and receiving operation in the first embodiment according to this invention.

The processor 10 (substantially, a communication line driver that is executed by the processor device 10; detailed description hereinafter) sets the communication data which it wishes to send to the system communication line 2 to the data buffer 26 and the send destination for the communication data to the address buffer 24 (Step 200). After the setting, the explicit sending conditions instructions are sent from the processing device 10, or are determined from the state of the state management device 22 (Step 202). After the sending conditions are realized, the communication device 14 sends communication data to the system communication line 2 via the input/output buffer 28 (Step 204). The communication device 14 that has completed sending notifies the communication device 14 with which communication is being done of transmission completion (Step 206). Subsequently, an end report is sent to its own processing device 10 (Step 208).

Meanwhile, the communication device 14 that received the transmitted communication data forwards the communication data to the memory 12 (Step 210). Subsequently, the communication device 14 that has been notified of transmission completion determines whether the destination of the communication data that has been received matches its own physical address range (Step 212). The communication device 14 which determined that received communication data is in its own physical address range, reports that communication data has been received at the receiving side processing device 10.

As a result, communication data of the processing device 10 at the sending side is store in the memory 12 at the receiving side.

Here the end report in Step 208 is not essential. For example, at the point when the processing device 10 completes writing of the communication data to the communication device 14, the processing device 10 may recognize that the sending process is complete.

Further, at the time of transmission to the memory 12, the receiving side communication device 14 may send notification of the forward destination address to the memory 12 using direct memory access or the like. For example, in the case where the system communication line 2 is a PCI bus and the communication device 14 is a PCI-to-local bus bridge, receive data for a specific address is written to the memory 12 immediately.

In addition, in Step 206, the interrupt notification function 30 of the device being communicated with may be used for notification that means transmission complete. In this case, first the communication device 14 at the transmission side determines whether the "bit corresponding to the processing module itself" of the interrupt notification register 32 of the interrupt notification function 30 of the receiving side communication device 14 is cleared, or in other words, if the device being communicated with is in a state where receiving is possible. If the bit has been cleared, the communication device 14 at the transmission side delivers communication data, and by setting the corresponding bit, the receiving side communication device 14 can know that the communication data has been received.

In this embodiment, process of setting communication data to the communication device 14 (Step 200) is performed by the processing device 10, but the communication data may be set by other means. For example, the communication device 14 may fetch communication data directly from the memory 12 using the direct memory access control device included in the state management device 22 for example.

Figure 4:
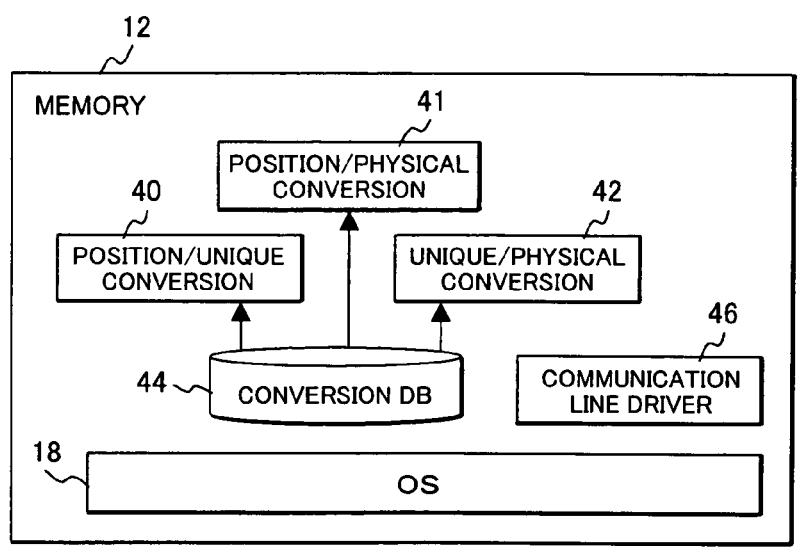
FIG. 4 is a block diagram of the communication functions of the processing device according to the embodiment 1.

FIG. 4 shows a functional diagram of the processing device related to transmitting and receiving of communication data in the first embodiment of this invention. In this embodiment, an example is shown in which the functions of the processing device 10 are executed by the software stored in the memory 12.

The functions that are stored in memory 12 and successively read by the processing device 10 and executed are the operating system (OS) 18, the position/unique conversion function 40, the position/physical conversion function 41, the unique/physical conversion function 42, the conversion database (DB) 44, and the communication line driver 46.

Here the value which indicates the processing module and is the only one in the processing system is called the unique logical address. The unique logical address is a value which points to the processor value itself and is useful in terms of convenience for managing the processing system. For example, the unique logical address may correspond to the media access control (MAC) address in the Ethernet (trademark).

OS 18 is a basic hardware for managing all the processing modules 1 and it manages scheduling of various tasks and resources such as memory and the like and executes system call which is a special process in the processing module.

The position/unique conversion function 40 is a function searches for and converts from its own physical position information that is obtained by the position identification device 20 to the unique logical address.

The position/physical conversion function 41 is the function which searches for and converts from the physical position information to the physical address. The unique/physical conversion function 42 searches for and converts from the unique logical address to the physical address of the corresponding communication device 14.

Figures 5, 6:
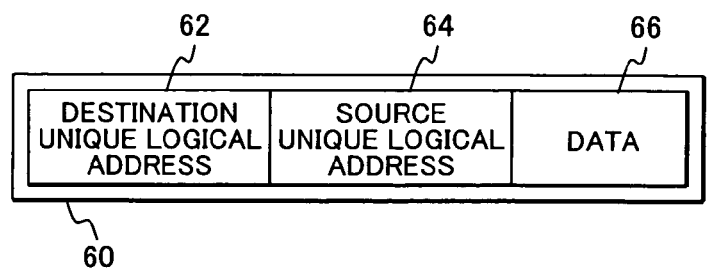
FIG. 5 is a configuration drawing which shows the mounting drawing for the conversion DB in the communication function.
FIG. 6 is a configuration drawing of the communication data packets.

FIG. 5 shows the structure of the conversion database 44. The conversion database 44 is a table which is formed of the physical address information 48, the unique logical address 50, and the physical address 52. The conversion database 44 is structured such that each of the processing modules matches in the processing system. For this reason, when the physical position information 48 is set, the unique logical address 50 and the physical address 52 can be uniquely set. The communication path driver 46 provides a procedure for sending and receiving data with the system communication line 2.

The procedure for obtaining its own unique logical address in the processing module 1 will be described. The processing device 10 obtains its own physical position information from the position identification device 20. Next the processing device 10 obtains its own unique logical address from the physical position information using the position/unique conversion function 40. It is possible for the processing module 1 to derive its own address from the physical position information using this procedure. Similarly, it is possible for the processing module 1 to know the physical address that it should respond to using the position/physical conversion function 41.

It is to be noted that the handling of the physical position information 48, the unique logical address 50, and the physical address 52 was shown in tabular form but the form for mounting is not limited to this structure provided that there can be correspondence between the data.

In the case where these relationships are expressed by the numerical model, the correspondence may be mounted as algorithms and realized as functions corresponding to the conversion database 44. In addition, if the physical position information 48 is given as an index, it may be expressed a sequence which outputs corresponding the unique logical address 50 and the physical address 52. Furthermore, the conversion database 44 does not necessarily need to be in the same memory and even if a part of the data exists in a separate memory or may be calculated in accordance with an algorithm. For example in the case where a PCI device is employed as the communication device 14, it obtains its own physical address 52 by referring to the configuration address register that is included in the PCI device, and the addresses of other processing modules may be calculated based on the range of its own address.

FIG. 6 shows a format of communication data (packet) in the first embodiment according to this invention. The delivered communication data packet 60 comprises the destination unique logical address 62, the source unique logical address 64 and the data 66. The destination unique logical address 62 is the unique logical address that corresponds to the processing module to which the communication data packet 60 is delivered. The source unique logical address 64 is the unique logical address that corresponds to the processing module to which transmits the communication data. Data 66 is the data that is to be sent.

Figure 7:
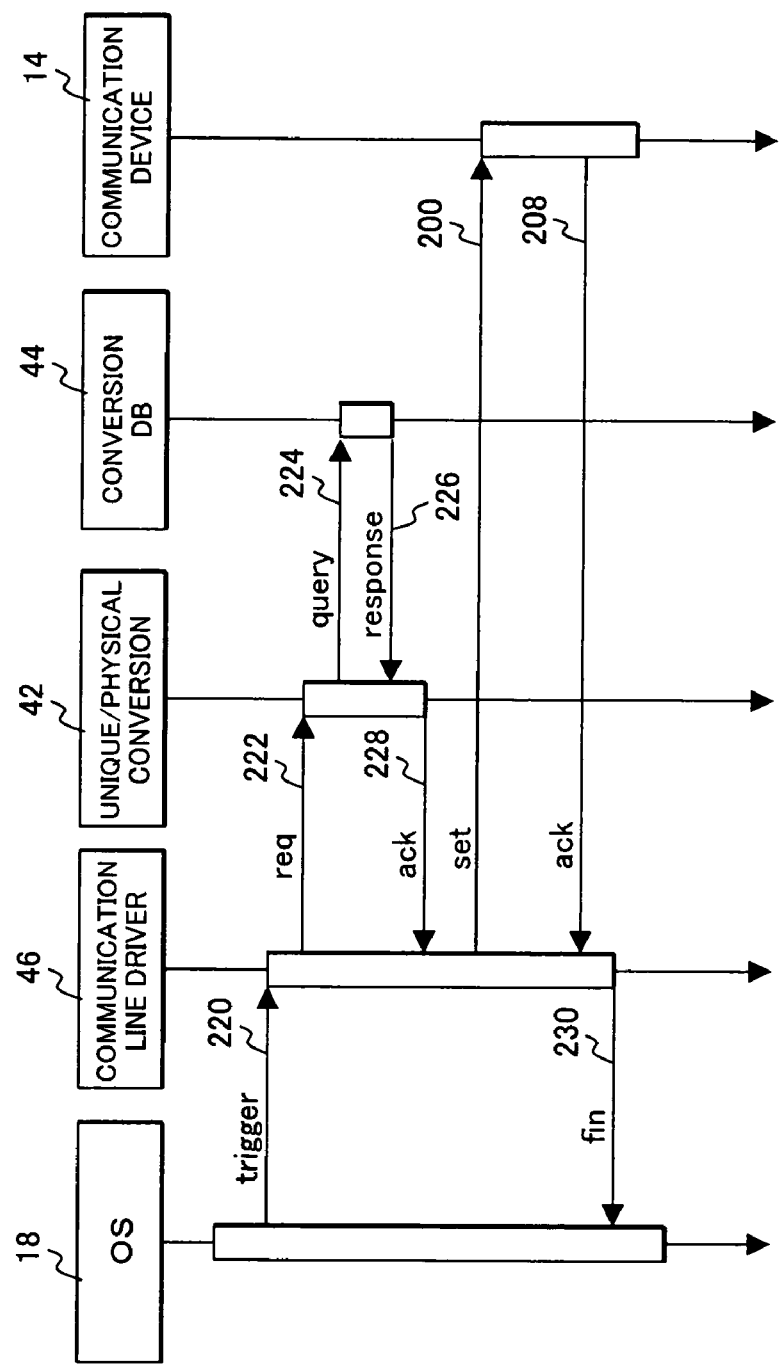
FIG. 7 is an operation sequence drawing for the communication line driver at the time of sending according to the embodiment 1.

FIG. 7 shows a communication data transmission process in the first embodiment according to this invention. First the OS 18 issues the communication data packet 60 (See FIG. 6) and the transmission request to the communication line driver 46 (Step 220). The communication line driver 46 issues a conversion request from the destination unique logical address 62 of the communication data packet 60 to the unique/physical conversion function 42 for obtaining the physical address in the system communication line 2 (Step 222). The unique/physical conversion function 42 searches the conversion DB 44 (Step 224) and the physical address is obtained (Step 226). The unique/physical conversion function 42 sends the response of the physical address corresponding to the unique physical address to the communication line driver 46 (Step 228). Subsequently, the obtained physical address is set to the address buffer 24 of the communication device, and the communication data packet 60 should be set to the data buffer 26 and the OS 18 is notified (Step 230) of the fact that transmission processing is complete (Step 208) via Step 200 in FIG. 3.

According to the processes described above, it is possible to manage the communication data using the unique logical address while changing it to the physical address during the transmission process and transmitting it to the processing module 1 being communicated with. For this reason, it becomes possible for the processing system design engineer to collect the physical address and the configuration information inside the processing system in only the conversion DB 44, and expansion and changes in the processing system becomes easy.

Figure 8:
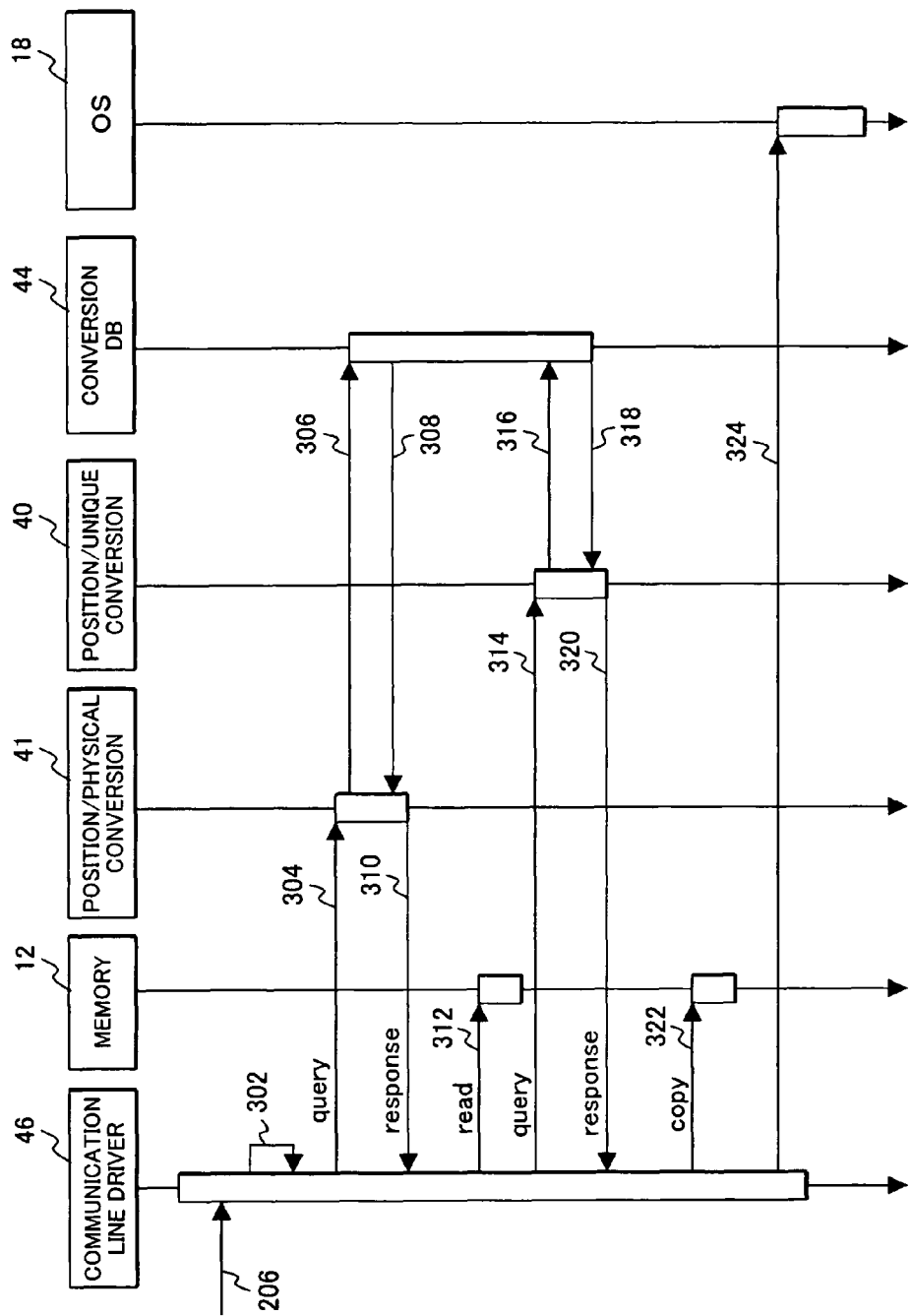
FIG. 8 is an operation sequence drawing for the communication line driver at the time of receiving according to the embodiment 1.

FIG. 8 shows a receiving procedure for the communication data in the first embodiment of this invention. When there is transmission end notification from the transmission side communication device (Step 206), the receiving side communication line driver 46 determines the communication device from which there was transmission (Step 302). Because the bit corresponding to the source is set at the receiving side interrupt notification register 32, the physical position of the source communication device can be determined.

In order to determine position where the transmitted data is stored from the physical position of the determined source, the communication line driver 46 refers to the position/physical conversion function 41 (Step 304). The position/physical conversion function 41 refers to the conversion database 44 with physical position as the key (Step 306) and obtains a response (Step 308). As a result, the address corresponding to the physical position replies to the communication line driver 46 (Step 310). The communication line driver 46 fetches the destination unique logical address 62 from the stored communication data packet 60 based on the determined physical address (Step 312). Subsequently, the destination unique logical address 62 and the position/unique conversion function 40 are referred to (Step 314). The position/unique conversion function 40 refers to the conversion database 44 with logical address 62 as the key as the key (Step 316) and obtains a response (Step 318). As a result, the position/unique conversion function 40 sends the response of the physical position corresponding to the unique logical address to the communication line driver 46 (Step 320). If the communication line driver 46 determines that the transmitted data packet 60 is communication data corresponding to its own physical position, the received data is copied to the region for notifying the OS 18 (Step 322) and a received report is made to the OS 18 (Step 324).

Due to the above, the communication line driver 46 specifies a source processing module for the data transmitted from a suitably selected processing module 1 and the data write address in memory is determined and a determination can be made as to whether the data is its own.

Figure 9:
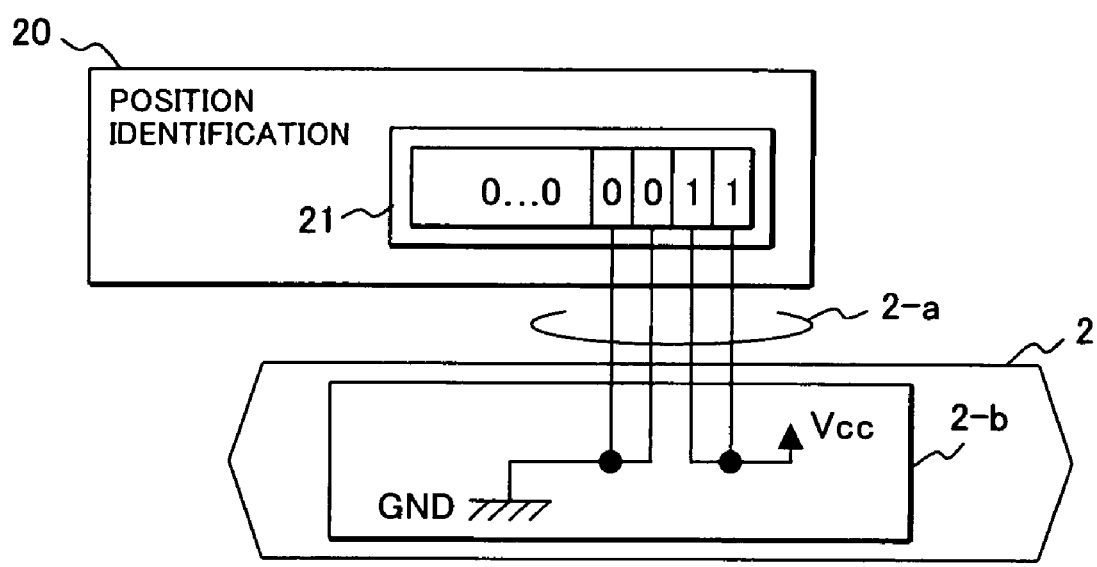
FIG. 9 is a mounting drawing of the position identification device according to the embodiment 1.

FIG. 9 is a configuration drawing of the position identification device of the first embodiment according to this invention. A configuration in which the system communication line 2 and the processing module 1 are independent, such as the case where the system communication line 2 is mounted on a printed circuit board of a back plane and the processing module 1 is mounted on a separate printed-circuit board shows a favorable configuration. In this case, mount position information direction device 2-b and position information instruction wire 2-a are prepared independently for each processing module 1. It is to be noted that in the mount position information direction device 2-b, GND means low voltage (value 0) and Vcc means high voltage (value 1).

The position identification device 20 has a position information register 21. This embodiment shows an example which has 4-bit information as the position information and displays that value as 0011 in binary numbers (3 in decimal numbers). Assuming that the position information shows the number of processing modules from a standard position, 3 (decimal number) means the third position from the standard position. That is to say, by the processing device 10 can know the unique logical address 50 which it determines itself by fetching position information "3" from the position identification device 20.

Figure 10:
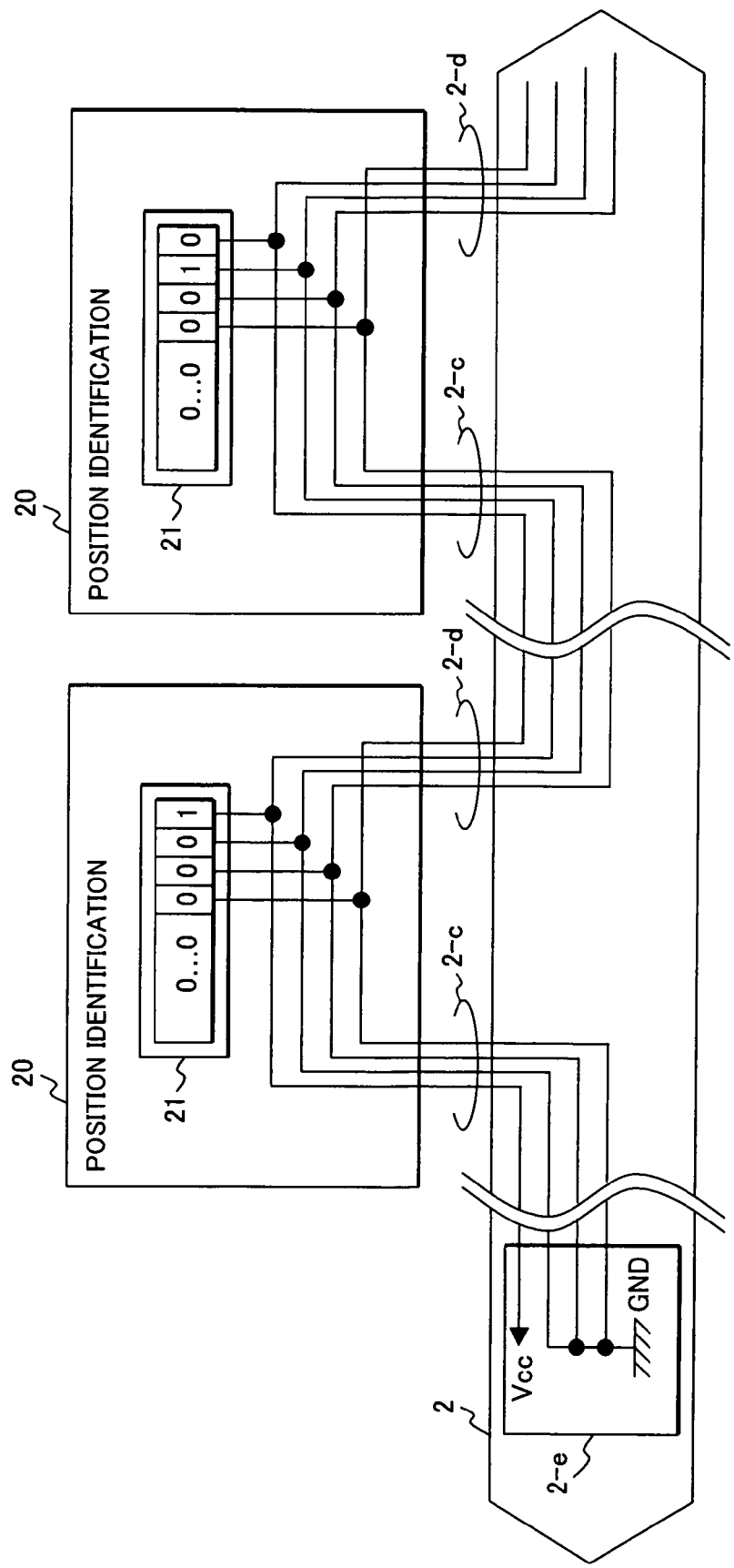
FIG. 10 is a mounting drawing showing another position identification device.

FIG. 10 shows another example of the position identification device of the first embodiment according to this invention. The configuration is favorable whether the system communication line 2 and the processing module 1 are independent or integral. In this case, the position information input 2-c which is the signal line to input to the processing module 1 and the position information output 2-d which is the signal line to be output from the processing module 1 exist between the system communication line 2 and the processing module 1. Unlike the case of FIG. 9, the mount position information direction device 2-e of this embodiment exists only at one end of the system communication line 2. In FIG. 10, the example of the position identification device 20 which positions at the first and second position from the mount position information direction device 2-e is shown.

A feature of this embodiment is that a portion of the signal line is "cross-coupled" between the position information inputs 2-c and the position information outputs 2-d of the same signal wire set. That is to say, even if the signal wire name is the same, if it separates from the mount position information direction device 2-e, a portion of the signal is shuffled and taken in. For this reason, in the mount position information direction device 2-e, as shown in the drawing, in the case where only one signal is connected to the Vcc, the position information register 21 which is nearer from the mount position information direction device 2-e is 0001 (binary numbers), while the adjoining position information register 21 has the value of 0010 (binary numbers).

In this embodiment, the configuration in which there are 4 position information inputs 2-c and position information outputs 2-d is shown, but this invention is not limited to this and the number of signal lines can be expanded in accordance with the number of processing modules.

In addition to this, a method for obtaining the position information according to inventors is disclosed in the specification of Japanese Application Patent Laid-Open Publication No. 2004-326342. Using known techniques or combinations thereof to obtain position information in the processing module 1 does not limit the effects of this invention.

According to this invention, in the processing system formed from a plurality of processing modules, it is possible for each processing module to ascertain its own physical position. For this reason, resources (such as unique logical address or the physical address for the processing module) relating to the processing module are not managed at a center and it is possible for each processing module to set the resources itself. As a result, the processing at the processing modules is equalized and a configuration suitable for embedded computers and configuring processing modules by cost becomes possible.

Embodiment 2

Figure 11A:
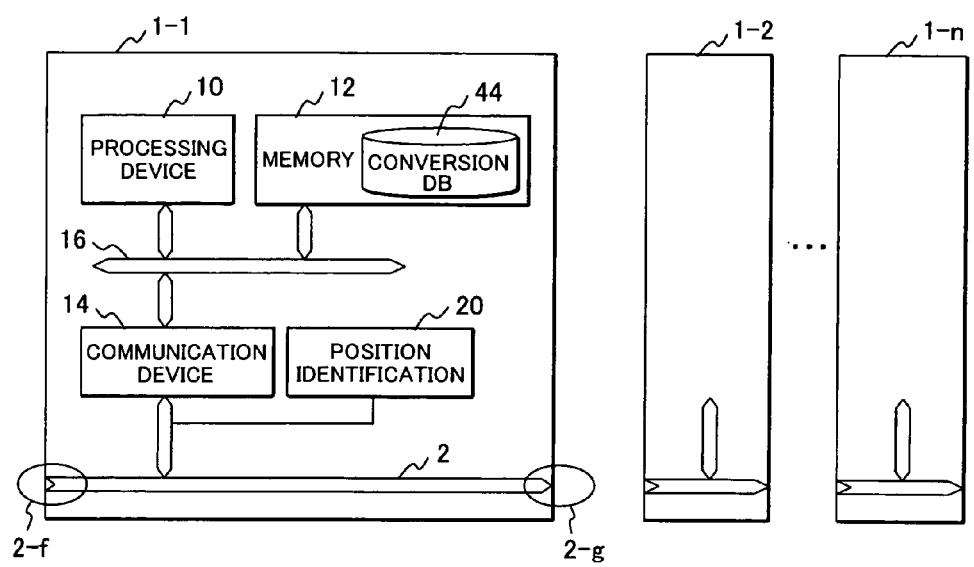
FIG. 11 is a configuration drawing of the processing system of the embodiment 2 of this invention.

Next, the second embodiment of this invention will be described. FIG. 11 is a configuration drawing of the processing system in the embodiment 2, and (a) shows a functional block diagram while (b) shows a physical configuration diagram. The numbers used in this embodiment refer to the same functions or elements as those of the embodiment 1 if not otherwise specified.

The feature of this embodiment is that the system communication line 2 is divided and each processing module 1 includes the divided system communication line 2. Both ends 2-f and 2-g of the system communication line 2 can be respectively expressed by connectors as shown in FIG. 11(b).

Figure 11B:
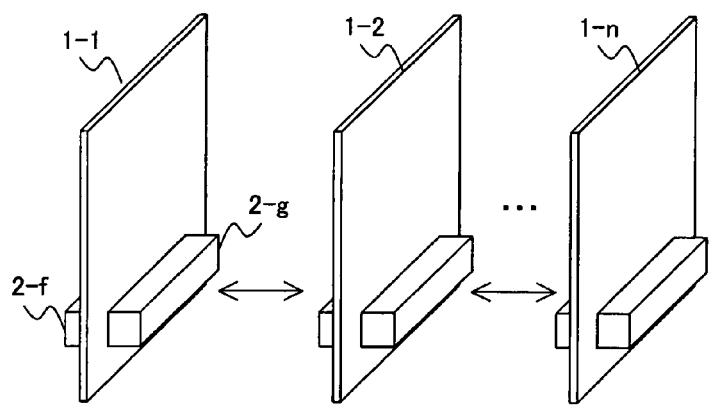

In this embodiment, by the processing module 1 being mounted on a printed circuit-board as shown in FIG. 11(b) and further by the system communication line 2 being mounted by the connector on the printed-circuit board, the processing system can be constructed by stacking these printed-circuit boards. In this case the mount position information direction device 2-e shown in FIG. 10 must be mounted to one of both ends of the system communication line 2, but, for example, this function may be mounted to a module which supplies electric power.

Even if the position identification device 20 in this embodiment forms the processing system by stacking each processing module 1 of the same printed-circuit board by using the position information fetching device shown in FIG. 10, it can be ensured that the position information that is fetched at each processing module 1 has a suitable value.

Due to the configuration shown in this embodiment, it is possible to construct a processing system that obtains the same effects as the embodiment 1.

Embodiment 3

Figure 12:
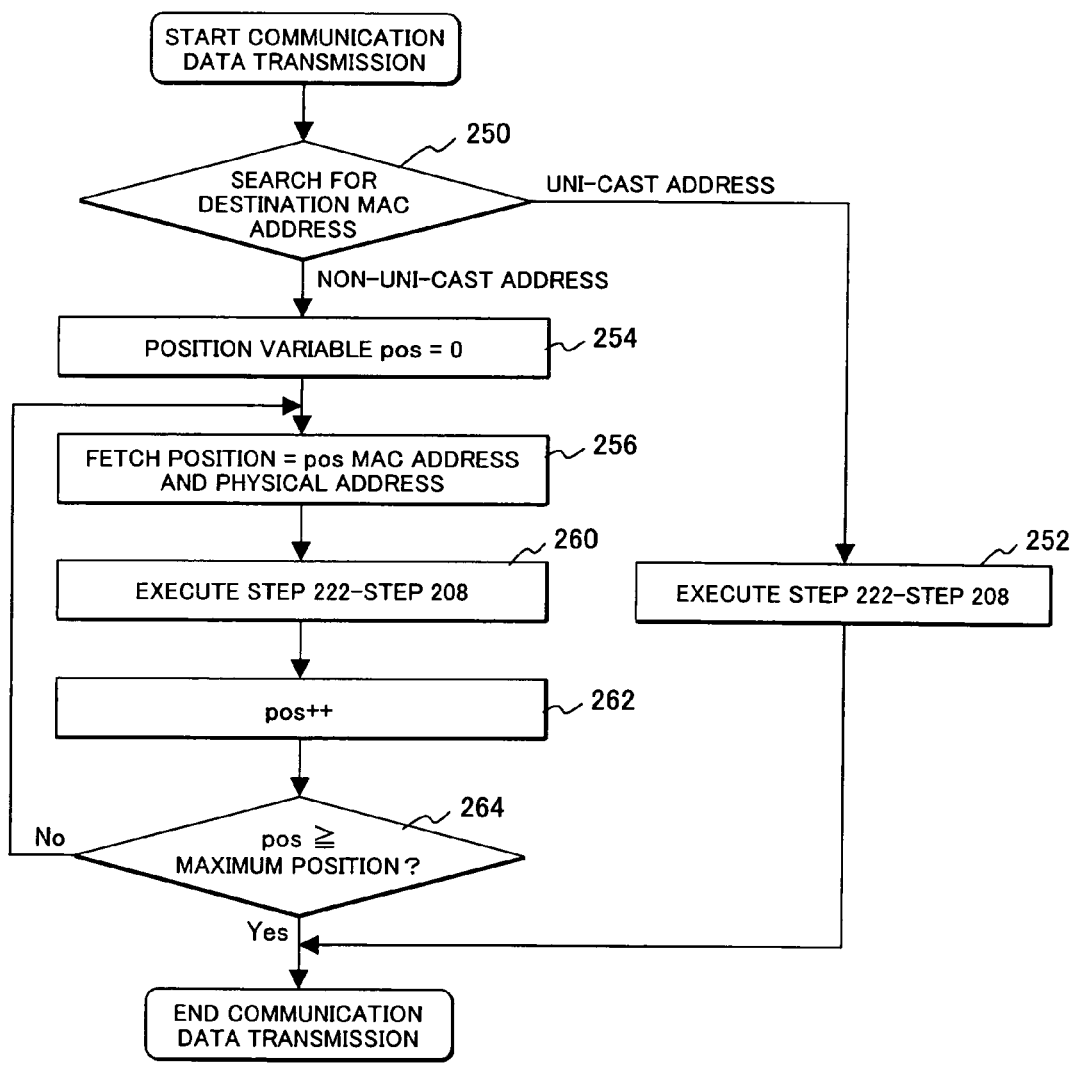
FIG. 12 is a flowchart of the procedures of the communication line drivers according the embodiment 3 of this invention.

The third embodiment of this invention will be described. FIG. 12 shows the process flow of the communication driver 46 of the processing device 10 which relates to the sending and receiving process of communication data. The processing system and the processing module 1 which are presumptions of this embodiment and the other elements which are not shown in particular, are the same-as the case of the embodiment 1.

The feature of this embodiment is in that it emulates communication corresponding to the Ethernet (registered trademark) in the system communication line 2. In this embodiment, when compared to the communication line driver 46 in FIG. 4 of the embodiment 1, the processing content of the communication line driver 46 in this embodiment is different.

In addition, the "unique logical address" in the embodiment 1 is the equivalent Ethernet "MAC" address in this embodiment and is appropriately replaced and used. It is to be noted that in the processing module 1 of this embodiment, the procedure for obtaining its own unique logical address (MAC address) is the same as the embodiment 1.

The operation of the communication line driver 46 will be described according to FIG. 12 will be described. This flow starts with Step 220 in which the OS 18 issues the communication data packet 60 and the transmission start request to the communication line driver 46. The communication line driver 46 searches for the destination MAC address of the communication data packet 60, and determines whether it is a uni-cast address or a non-uni-cast address (broadcast or multi-cast) address (Step 250). In the Ethernet, in the case where the value of the least significant bit (LSB) of the first octet of the MAC address is 0, it is a uni-cast address.

Here, in the case where the MAC address is a unicast address, Step 222 to Step 208 of FIG. 7 are executed (Step 252) based on the obtained MAC address and the communication delivery process is complete.

Meanwhile, in the case where the MAC address is a non-uni-cast address, corresponding communication data packets 60 must be transmitted to all the processing modules 1. Thus the position variable pos is initialized to 0 (Step 254), and from Step 256 to Step 260 are repeatedly executed for the processing modules 1 that are present at all the positions.

The position variable pos, the equivalent MAC address and physical address are obtained from the conversion DB 44 (Step 256). Subsequently, the changed communication data packet 60 is delivered to the object processing module 1 (Step 260). After delivery, the position variable pos is increased by 1 (Step 262), and next a determination is made as to whether there is another object for transmission (Step 264). In the case where the maximum number of processing units have not been exceeded, from Step 256 to Step 264 are repeated again, and the case where it is exceeded, the communication data delivery process ends.

Due to the above process, even in a system communication line 2 which can only do 1 to 1 communication, broadcast operation becomes possible. According to the broadcast operation, the process for address resolution protocol (ARP) for example becomes possible and automatic resolution of the MAC address that has the corresponding processing module 1 becomes possible.

According to this embodiment, it becomes possible for each processing module 1 to autonomously set the MAC address to be unique and determination of the physical address in the system communication line 2 becomes possible. As a result, because operation like the Ethernet becomes possible using a physical layer that is different from the Ethernet, the user of the processing system and the application design engineer can benefit from the convenience of the Ethernet.

Of course, there are no limits to applying this embodiment in the same manner to the configuration shown in the embodiment 2.

According to this invention, it becomes possible to use network technology such as TCP/IP on the communication lines between processing modules which have physical layers that are different from the Ethernet. As a result, by causing the physical layer to use an existing system bus and making the host network layer and above TCP/IP, even in the old processing system, it is possible to construct a processing system which has high compatibility with information system networks.

What is claimed is:

1. A processing system having a plurality of processing modules connected via a communication line,
where each processing module comprises:
a database to fetch either:
a unique logical address indicating the processing module or a physical address of the processing module in the communication line, which are corresponding to mounting position information for each processing module in the communication line;
a position identification device to identify the mounting position information which is defined according to the physical mounting position of the processing module in the communication line of the processing module;
a unique/physical address conversion device to fetch the physical address corresponding to the unique logical address from the database;
a communication device for performing communication between the processing modules;
a memory for storing communication data received from the communication line according to a request from the communication device;
a position/physical address conversion device to fetch the physical address corresponding to the mounting position information from the database; and
an interrupt notification device to notify the processing module after receiving the communication data from another processing module and to notify the mounting position information of a source processing module;
wherein, when a communication data packet is transmitted, the physical address is fetched from the unique logical address included in the communication data packet by the unique/physical address conversion device, and the communication data packet is transmitted to the physical address through the communication line; and
when a communication data packet is received, a source mounting position information of the communication data packet which is notified by the interrupt notification device is fetched, and the physical address in which the communication data packet is stored in the memory is fetched by the position/physical address conversion device.

2. The processing system according to claim 1;
where the communication line is included in the processing module, and the processing system can be constructed by stacking the processing modules.

3. The processing system according to claim 1;
where the communication line performs data communication using a PCI bus protocol.

4. A processing system having a plurality of processing modules connected via a communication line,
wherein each processing module comprising:
a database to fetch either:
a unique logical address indicating the processing module or a physical address of the processing module in the communication line, which are corresponding to a mounting position information for each processing module in the communication line;

a position identification device to identify the mounting position information which is defined according to the physical mounting position of the processing module in the communication line of the processing module;

a unique/physical address conversion device to fetch the physical address corresponding to the unique logical address from the database;

a communication device for performing communication between the processing modules;

a memory for storing communication data received from the communication line according to a request from the communication device;

a position/physical address conversion device to fetch the physical address corresponding to the mounting position information from the database; and an interrupt notification device to notify the processing module after receiving the communication data from another processing module and to notify the mounting position information of a source processing module;

wherein, when a communication data packet is transmitted, the physical address is fetched from the unique logical address included in the communication data packet by the unique/physical address conversion device, and the communication data packet is transmitted to the physical address through the communication line, and a communication driver to determine a send destination for the data packet by the unique logical address of the destination included in the data packet, and in the case where the unique logical address of the destination is in a plurality of processing modules, the physical address of all the processing modules in the processing system are searched from the database and the data packet is sent to all the processing modules, and when a communication data packet is received, a source mounting position information of the communication data packet which is notified by the interrupt notification device is fetched, and the physical address in which the communication data packet is stored in the memory is fetched by the position/physical address conversion device.

5. The processing system according to claim 4;

wherein the communication line performs data communication using PCI bus protocol.

6. The processing system according to claim 4;

where the communication line is included in the processing module, and the processing system can be constructed by stacking the processing modules.

\* \* \* \* \*